United States Patent
Horning et al.

(10) Patent No.: US 10,989,306 B2
(45) Date of Patent: Apr. 27, 2021

(54) PACKING STACK CARRIER FOR PAINT AND OTHER FLUID PUMPS

(71) Applicant: Graco Minnesota Inc., Minneapolis, MN (US)

(72) Inventors: Jeromy D. Horning, Albertville, MN (US); August F. Legatt, Maple Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 257 days.

(21) Appl. No.: 16/352,561

(22) Filed: Mar. 13, 2019

(65) Prior Publication Data

US 2019/0301615 A1    Oct. 3, 2019

Related U.S. Application Data

(60) Provisional application No. 62/649,003, filed on Mar. 28, 2018.

(51) Int. Cl.
*F04B 1/04* (2020.01)
*F16J 15/3252* (2016.01)
(Continued)

(52) U.S. Cl.
CPC ......... *F16J 15/3252* (2013.01); *F04B 1/0408* (2013.01); *F04B 15/02* (2013.01);
(Continued)

(58) Field of Classification Search
CPC ...... F16J 15/32; F16J 15/3248; F16J 15/3252; F16J 15/3256; F16J 15/3264; F16J 15/3268; F16J 15/56; F04B 1/0408; F04B 15/02; F04B 53/143; F04B 53/147; F04B 53/164; F04B 53/144; F04B 19/22
See application file for complete search history.

(56) References Cited

U.S. PATENT DOCUMENTS 1,956,843 A    5/1934   Wheeler
2,037,046 A    4/1936   Robertson
(Continued)

FOREIGN PATENT DOCUMENTS

CN    1224118 A       7/1999
CN    202607576 U    12/2012
(Continued)

OTHER PUBLICATIONS

First Chinese Office Action for CN Application No. 2019102328757, dated Apr. 24, 2020, pp. 11.
(Continued)

*Primary Examiner* — Gilbert Y Lee
(74) *Attorney, Agent, or Firm* — Kinney & Lange, P.A.

(57) ABSTRACT

A packing assembly includes a clip configured to hold a packing stack in a desired arrangement on a longitudinal axis. The clip includes upper arms and lower arms through which the packing stack and slide laterally into and out of the clip. The upper arms and lower arms prevent radial movement of the packing stack and can further prevent axial movement of the packing stack relative to the clip. The clip facilitates installation of the packing stack on a piston by shifting the assembled packing stack axially onto the piston and then pulling laterally off of the packing stack while leaving the packing stack on the piston rod.

20 Claims, 12 Drawing Sheets

(51) Int. Cl.
*F04B 53/16* (2006.01)
*F04B 1/0408* (2020.01)
*F04B 53/14* (2006.01)
*F04B 15/02* (2006.01)
*F04B 19/22* (2006.01)

(52) U.S. Cl.
CPC .......... *F04B 53/143* (2013.01); *F04B 53/147* (2013.01); *F04B 53/164* (2013.01); *F04B 19/22* (2013.01); *F04B 53/144* (2013.01)

(56) References Cited

U.S. PATENT DOCUMENTS

| | | | |
|---|---|---|---|
| 2,860,535 | A | 11/1958 | Fowler |
| 3,030,702 | A | 4/1962 | Fowler |
| 3,069,178 | A | 12/1962 | Rosen |
| 3,168,774 | A | 2/1965 | Volkening |
| 3,266,347 | A | 8/1966 | Robertson |
| 3,357,283 | A | 12/1967 | Geyer et al. |
| 3,588,126 | A | 6/1971 | McKillop et al. |
| 3,639,972 | A | 2/1972 | Schelin et al. |
| 3,861,020 | A | 1/1975 | Moewe |
| 3,877,574 | A | 4/1975 | Killick |
| 3,942,234 | A | 3/1976 | Kepler |
| 3,946,873 | A | 3/1976 | MacDonnell |
| 4,141,129 | A | 2/1979 | Martini |
| 4,610,834 | A | 9/1986 | Baron et al. |
| 4,615,440 | A | 10/1986 | Downing |
| 4,719,684 | A | 1/1988 | Mutter |
| 5,535,909 | A | 7/1996 | Philip |
| 5,971,028 | A | 10/1999 | Kurimoto et al. |
| 6,779,660 | B1 | 8/2004 | Calvert et al. |
| 7,690,505 | B2 | 4/2010 | Pete et al. |
| 8,001,995 | B2 | 8/2011 | Molloy |
| 8,616,555 | B2 | 12/2013 | Sridhar et al. |
| 8,640,314 | B2 | 2/2014 | Armstrong |
| 9,179,989 | B2 | 11/2015 | Mullaly |
| 9,494,237 | B2 | 11/2016 | Veiga et al. |
| 9,511,486 | B2 | 12/2016 | Lammers et al. |
| 9,636,810 | B2 | 5/2017 | Lammers et al. |
| 2003/0084556 | A1 | 5/2003 | Dunlop |
| 2008/0301924 | A1 | 12/2008 | Jarrett |
| 2011/0277987 | A1 | 11/2011 | Frazier |

FOREIGN PATENT DOCUMENTS

| | | |
|---|---|---|
| CN | 103991055 A | 8/2014 |
| CN | 204961281 U | 1/2016 |
| CN | 107598830 A | 1/2018 |
| CN | 107806440 A | 3/2018 |
| CN | 210164624 U | 3/2020 |
| DE | 4100045 C1 | 7/1992 |
| DE | 102005001225 A1 | 7/2006 |
| EP | 0185753 B1 | 7/1986 |
| EP | 0927824 A2 | 7/1999 |
| EP | 0927825 B1 | 9/2004 |
| WO | WO9303279 A1 | 2/1993 |
| WO | WO9816742 A1 | 4/1998 |
| WO | WO2017034996 A1 | 3/2017 |

OTHER PUBLICATIONS

First Chinese Office Action for CN Application No. 2019102386358, dated Sep. 17, 2020, pp. 12.

Extended European Search Report for EP Application No. 19165913.5, dated Jun. 14, 2019, pp. 6.

Extended European Search Report for EP Application No. 19165912.7, dated Jun. 14, 209, pp. 6.

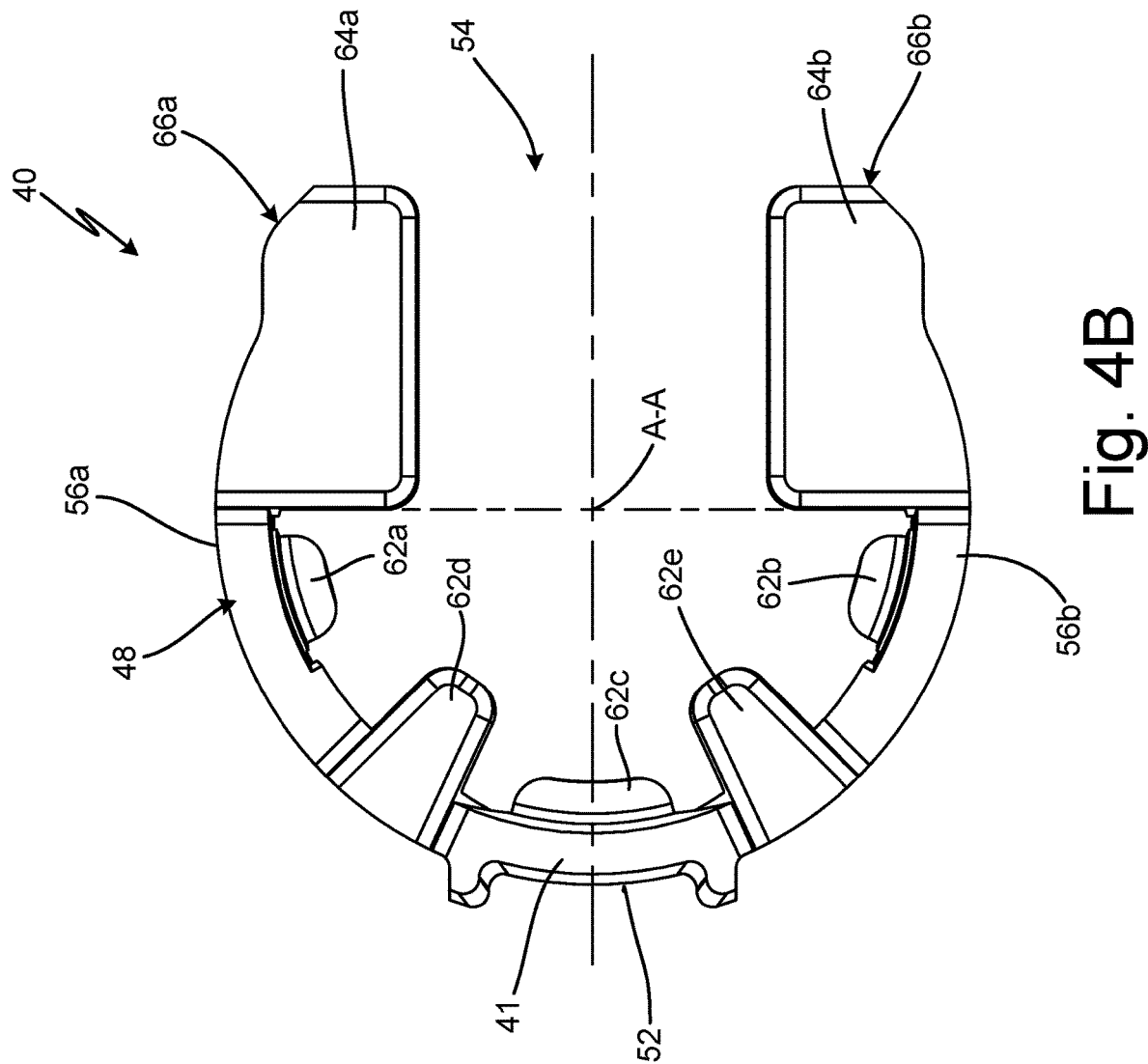

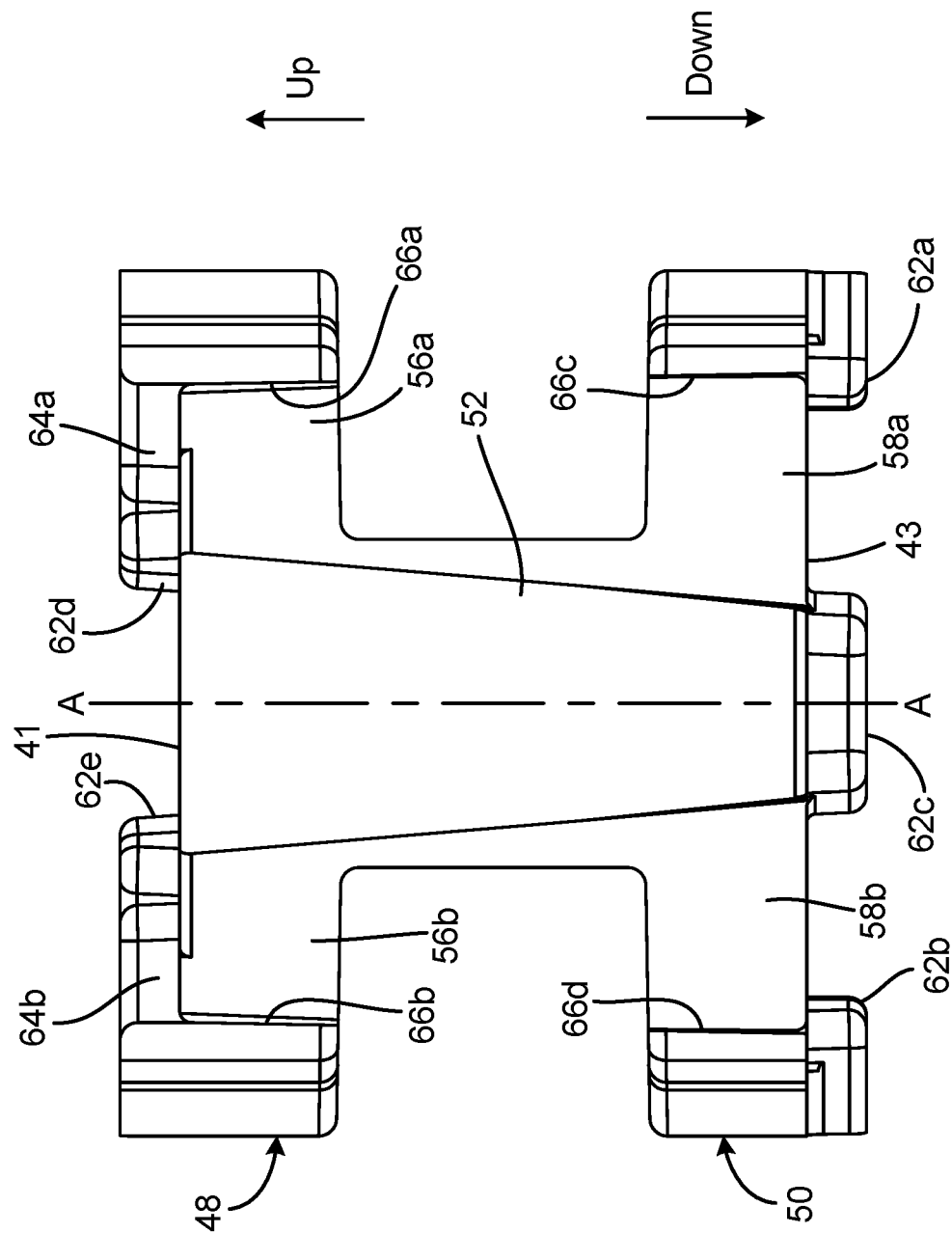

PACKING STACK CARRIER FOR PAINT AND OTHER FLUID PUMPS

CROSS-REFERENCE TO RELATED APPLICATION(S)

This application claims priority to U.S. Provisional Application No. 62/649,003 filed on Mar. 28, 2018, and entitled "PACKING STACK CARRIER FOR PAINT AND OTHER FLUID PUMPS," the disclosure of which is hereby incorporated by reference in its entirety.

BACKGROUND

The present disclosure relates to piston pumps, and in particular sealing elements within the pumps.

Piston pumps are used to pump fluids, typically at high pressures. The pump elements disclosed herein are particularly well suited for pumping paint, finishes, and other coatings which are typically abrasive, viscous, and/or otherwise difficult to pump. Packings are used to facilitate forming a dynamic seal in such difficult to handle fluid applications.

Packings are rings of sealing material. A packing can be formed from leather, rubber, polymer (e.g., ultra high molecular weight polyethylene or UHMWPE), and/or synthetic material. Packings commonly have complementary cross sections, such as having U or V cross section shapes, to mate and stack upon one another. Packings are typically arranged in a stack, such as six or more packing rings mounted atop one another. Packings of different types can be arranged in an alternating arrangement, such as leather-synthetic-leather-synthetic-leather-synthetic or other combination.

Glands are rings (typically metal) which having complementally cross sectional profiles, such as having U or V projecting and recessed cross sectional shapes to mate and stack with the packings. A set of two glands are typically placed at both ends (top and bottom) of the stack of packings, bracketing the stack of packings. The glands can then be fixed to a component of the pump. The glands can retain the stack of packings within the pump.

Packings are used as dynamic sealing surfaces in which the packings either move with the piston or the piston moves relative to the packings. For example, a stack of packings can be mounted on a piston rod such that the packings move with the piston rod and slide along the inner surface of the bore of the cylinder. In other examples, a stack of packings can be mounted on the inside bore of a cylinder and are held static relative to the cylinder while the piston slides along the packings. In both examples, the packings seal between the cylinder and the piston to prevent leakage of fluid past the packings between the cylinder and the piston. When packings are used with double displacement pumps, two stacks of packings are commonly used. A first set of packings seal along the pump rod of the piston, commonly known as throat packings. A second set of packings seal along the piston head of the piston, commonly known as piston packings.

Packings can be difficult to handle and install, particularly when in a stacked arrangement. Within the pump, the packings are arranged coaxial and contacting one another, but can fall out of coaxial, contacting alignment when not secured in place. If one packing in a stack is not coaxially aligned with the rest of the packings in a stack, then the stack cannot be properly aligned within the cylinder and/or on the piston.

SUMMARY

According to one aspect of the disclosure, a clip for holding a stack of packing rings having a first stack end, a second stack end, and a central bore through both the first stack end and the second stack end, on a longitudinal axis. The clip includes a spine having a first end and a second end; a first bracket extending from the first end of the spine partially around the axis, the first bracket configured to hold the first stack end; and a second bracket extending from the second end of the spine partially around the axis, the second bracket configured to hold the second stack end. The first bracket and the second bracket define a side opening oriented to allow the packing stack to slide laterally relative to the axis and out from between the first bracket and the second bracket.

According to another aspect of the disclosure, a method includes sliding a packing assembly in a first axial direction and onto an end of a piston for a reciprocating fluid pump. The packing assembly includes a clip having at least one bracket defining a side opening; and a packing stack retained on the clip and held in axial alignment on a longitudinal axis by the at least one bracket of the clip. The method further includes shifting the clip laterally relative to the piston to disengage the packing stack from the clip through the side opening leaving the packing stack disposed on the piston.

According to yet another aspect of the disclosure, an assembly includes a packing stack formed from a plurality of packing rings dispose on a stack axis, and a clip configured to hold the packing stack. The packing stack includes a first stack end; a second stack end disposed opposite the first stack end; and a central bore extending through the plurality of packing rings between the first stack end and the second stack end. The clip includes a spine having a first end and a second end; a top portion extending partially around the axis from the first end of the spine; and a bottom portion extending partially around the axis from the second end of the spine. The top portion and the bottom portion define an axially extending side opening oriented to allow the packing stack to slide laterally relative to the axis into and out of an area defined between the top portion, the bottom portion, and the spine.

BRIEF DESCRIPTION OF THE DRAWINGS

FIG. 4B is a bottom plan view of the clip shown in FIG. 4A.

FIG. 4E is a front elevation view of the clip shown in FIG. 4A.

DETAILED DESCRIPTION

Figure 1:
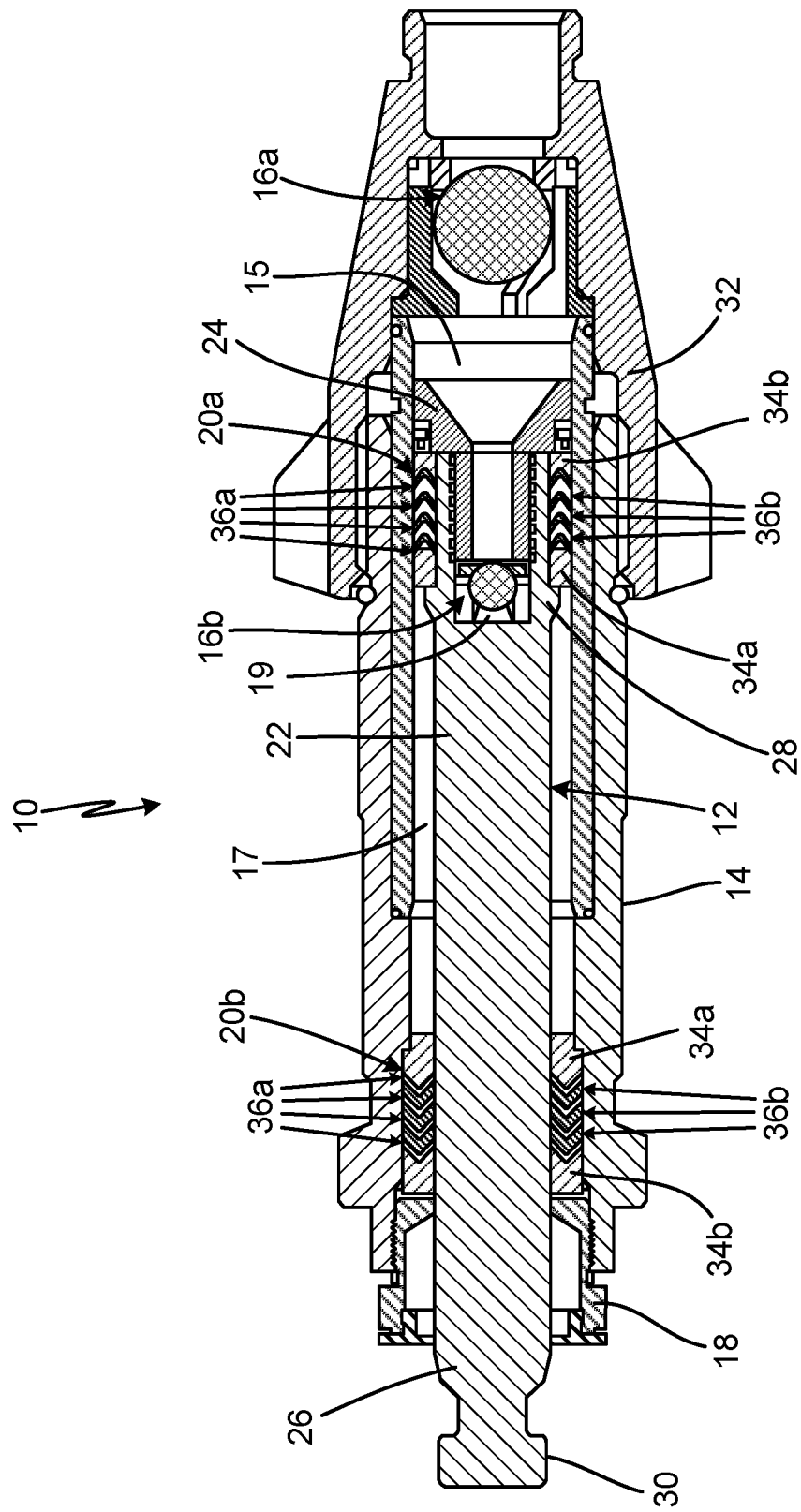
FIG. 1 is a cross-sectional view of a pump.

FIG. 1 is a cross-sectional view of pump 10. Pump 10 includes piston 12, cylinder 14, check valves 16a, 16b, retaining nut 18, packing stack 20a, and packing stack 20b. Piston 12 includes piston rod 22 and piston head 24. Piston rod 22 includes first end 26 and second end 28. First end 26 includes rod head 30. Intake housing 32 is disposed at a bottom of cylinder 14. Packing stack 20a includes glands 34a, 34b and packings 36a, 36b. Packing stack 20b also includes glands 34a, 34b and packings 36a, 36b.

Pump 10 reciprocates piston 12 within cylinder 14 to pump various fluids, examples of which include paint, water, oil, stains, finishes, aggregate, coatings, and solvents, amongst other options. Pump 10 can generate high fluid pumping pressures, such as 3,000-5,000 pounds per square inch (psi) or even higher. High fluid pumping pressure is useful for atomizing the fluid into a spray for applying the fluid to a surface.

Piston 12 is disposed within cylinder 14 and configured to reciprocate within cylinder 14. First end 26 extends out of cylinder 14 through throat packings 20b. Rod head 30 is disposed outside of cylinder 14 and is configured to connect to a drive system that drives reciprocation of piston 12. Piston head 24 is connected to second end 28 of piston rod 22. Piston head 24 can be connected to piston rod 22 in any desired manner, such as by interfaced threading or welding. In other examples, piston head 24 is integrally formed with piston rod 22, such that piston rod 22 and piston head 24 form a unitary assembly. Check valve 16b is disposed within piston rod 22. In the example shown, piston head 24 retains check valve 16b within piston rod 22.

Intake housing 32 is connected to the bottom of cylinder 14. In some examples, intake housing 32 is threadedly connected to cylinder 14. Check valve 16a is disposed within intake housing 32 and forms a one-way check valve to allow fluid to flow downstream into intake housing 32 while preventing the fluid from flowing upstream out of intake housing 32.

Retaining nut 18 is located at an opposite end of pump 10 from intake housing 32. Retaining nut 18 is secured to cylinder 14 and is configured to retain packing stack 20b within cylinder 14. Retaining nut 18 can be secured to cylinder 14 in any desired manner, such as by interfaced threading. Packing stack 20b is disposed within cylinder 14. Piston rod 22 extends through packing stack 20b and can reciprocate relative to packing stack 20b.

Packing stack 20b is configured to seal between piston rod 22 and the inner wall of cylinder 14. Packing stack 20a is disposed within cylinder 14 between piston 12 and cylinder 14. Packing stack 20a is configured to seal between piston 12 and the inner wall of cylinder 14.

Piston 12 reciprocates within cylinder 14 to increase and decrease the volumes of both upstream chamber 15 and downstream chamber 17. Increasing and decreasing the volumes of upstream chamber 15 and downstream chamber 17 draws fluid into cylinder 14 and pumps the fluid downstream out of cylinder 14. During an upstroke, upstream chamber 15 expands creating suction and causing check valve 16a to open, while downstream chamber 17 shrinks, thereby causing check valve 16b to close and driving the fluid out of downstream chamber 17. During a downstroke, upstream chamber 15 shrinks, thereby causing check valve 16a to close, while downstream chamber 17 expands, opening check valve 16b and causing the fluid to flow from upstream chamber 15 to downstream chamber 17 through check valve 16b and piston rod 22. The fluid enters downstream chamber 17 through outlet 19 formed though piston rod 22. Pump 10 can be a double displacement pump such that piston 12 drives fluid downstream out of cylinder 14 during both the upstroke and the downstroke.

For each of packing stack 20b and packing stack 20a, packings 36a, 36b are arrayed between glands 34a, 34b. Packings 36a, 36b and glands 34a, 34b can be of any desired size and in any desired arrangement for suitably sealing around piston 12 during reciprocation of piston 12. Packings 36a, 36b are rings of sealing material and can be formed from leather, rubber, polymer (e.g., ultra high molecular weight polyethylene or UHMWPE), and/or synthetic material. Packings 36a, 36b commonly have complementary cross sections, such as having U or V cross section shapes, to mate and stack upon one another. Packings 36a, 36b are typically arranged in a stack, such as six or more packing rings mounted atop one another. Packings 36a, 36b of different types can be arranged in an alternating arrangement, such as leather-synthetic-leather-synthetic-leather-synthetic or other combinations. Glands 34a, 34b are typically formed from a metal. Each of packing stack 20b and packing stack 20a typically include one male gland, such as gland 34a, and one female gland, such as gland 34b, to complement the cross-sections of packings 36a, 36b. Packings 36a, 36b are sandwiched between glands 34a, 34b.

Figure 2A:
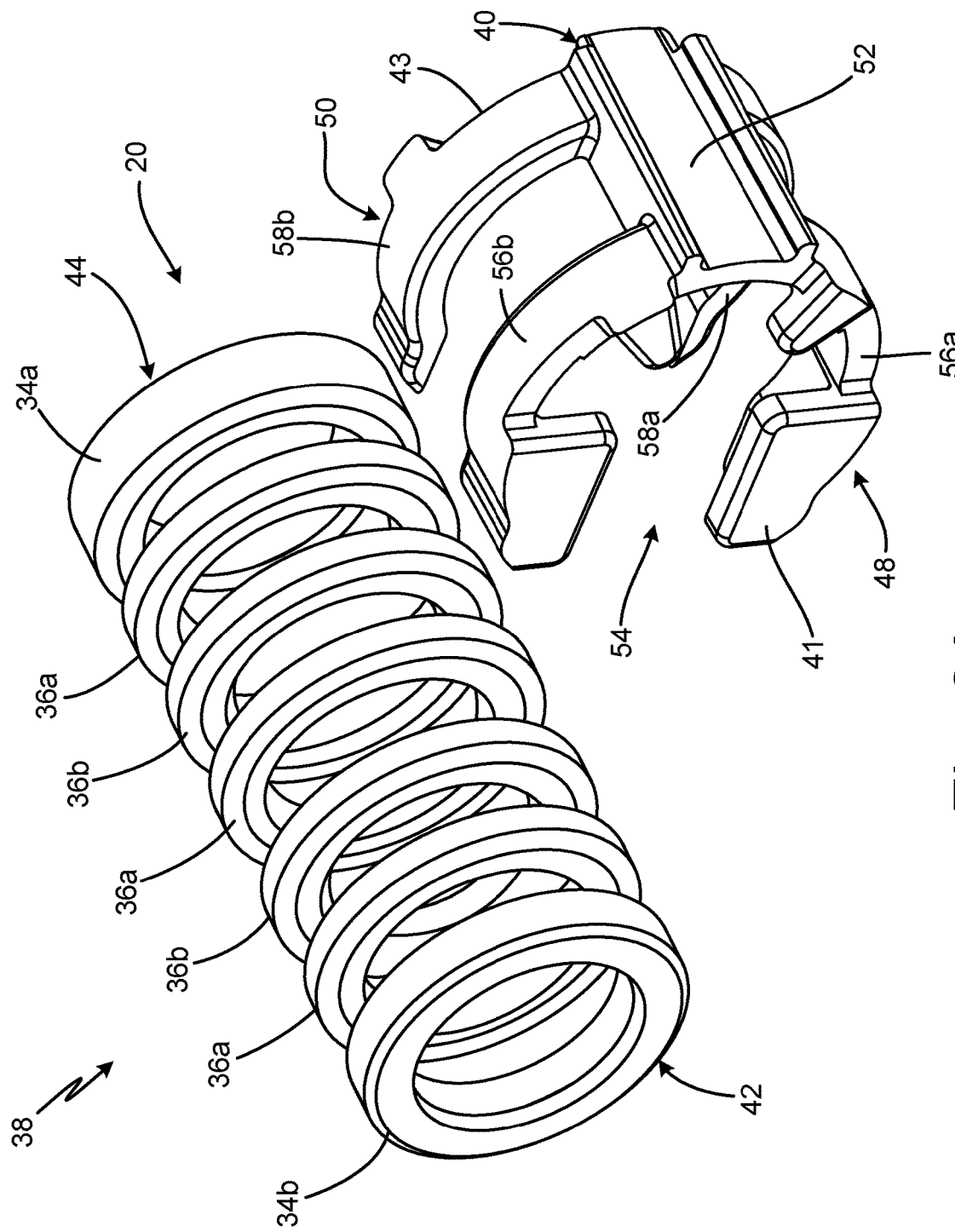
FIG. 2A is an exploded view of a clip and packings assembly.
Figure 2B:
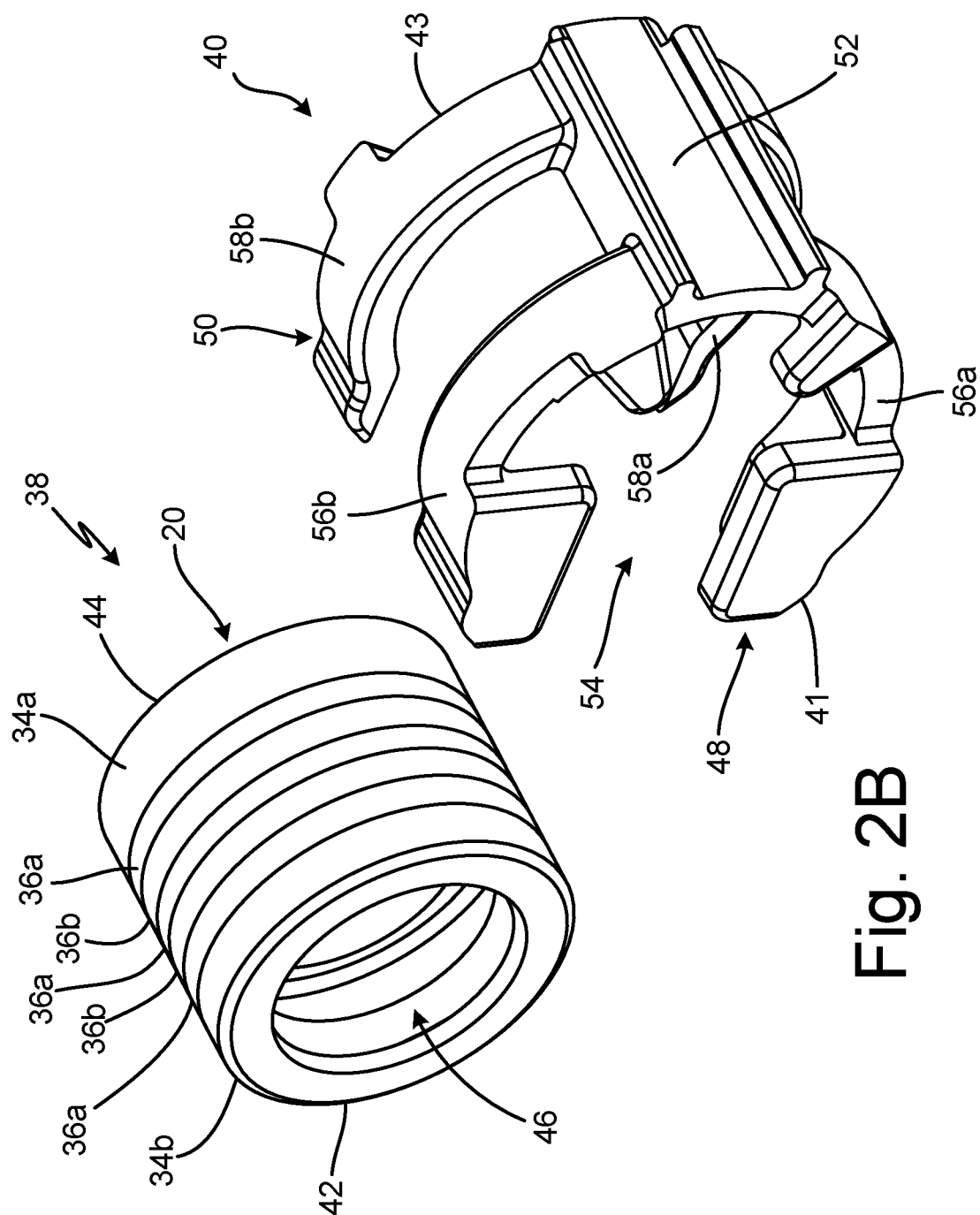
FIG. 2B is a partially exploded view of the clip and packings assembly shown in FIG. 2A.
Figure 2C:
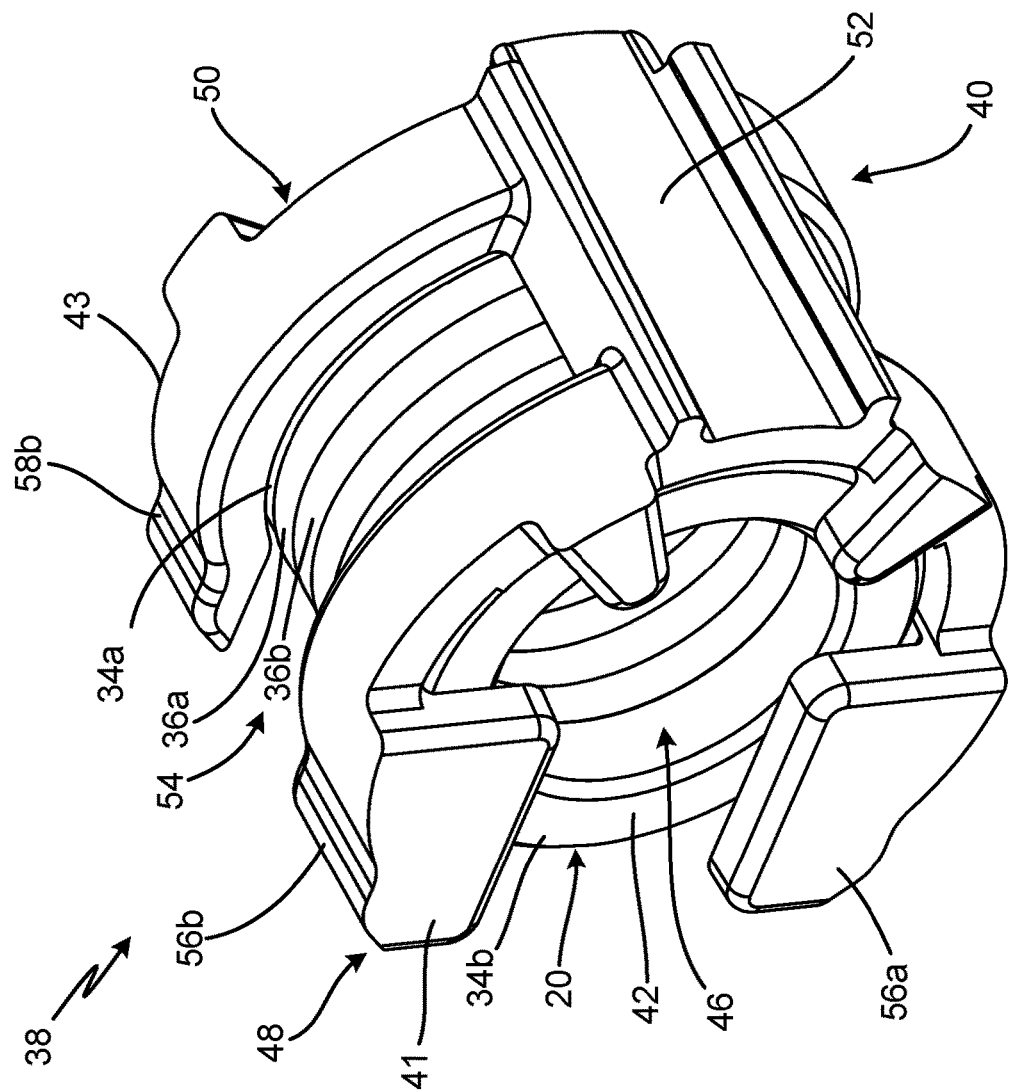
FIG. 2C is an isometric view of the clip and packings assembly shown in FIG. 2B.

FIG. 2A is an exploded view of assembly 38. FIG. 2B is a partially exploded view of assembly 38. FIG. 2C is an isometric view of assembly 38. Assembly 38 includes packing stack 20 and clip 40. Packing stack 20 includes glands 34a, 34b; packings 36a, 36b; first stack end 42; second stack end 44; and central bore 46. Clip 40 includes top side 41, bottom side 43, top portion 48, bottom portion 50, spine 52, and side opening 54. Top portion 48 includes upper arms 56a, 56b. Bottom portion 50 includes lower arms 58a, 58b.

Packings 36a, 36b are arrayed in a coaxial stack about longitudinal axis A-A prior to installation. Glands 34a, 34b are disposed on opposite sides of packings 36a, 36b. Top portion 48 extends around top side 41 of clip 40. Top portion 48 can also be referred to as a bracket. Bottom portion 50 extends around bottom side 43 of clip 40. Bottom portion 50 can also be referred to as a bracket. As shown, top portion 48 extends from a first axial end of spine 52 and bottom portion 50 extends from a second axial end of spine 52. In some examples, spine 52 is the only portion of clip 40 that extends between and connects top portion 48 and bottom portion 50. Each of top portion 48 and bottom portion 50 can be arcuate, though it is understood that each of top portion 48 and bottom portion 50 can be of any desired configuration for receiving and retaining packing stack 20. Upper arms 56a, 56b extend from opposite lateral sides of spine 52. Lower arms 58a, 58b similarly extend from opposite lateral sides of spine 52. Side opening 54 is defined between upper arm 56a and upper arm 56b, and between lower arm 58a and lower arm 58b.

In FIG. 2A, packings 36a, 36b and glands 34a, 34b are shown in an exploded configuration, such that packings 36a, 36b are not in contact in a coaxially aligned stack. Prior to installation on clip 40, packings 36a, 36b and glands 34a, 34b are placed in the arrangement shown in FIG. 2B, such that packings 36a, 36b and glands 34a, 34b are in contact and in coaxial alignment for installation on piston 12 (FIGS. 1 and 3A-3C).

From the arrangement shown in FIG. 2B, the assembled packing stack 20 formed by packings 36a, 36b and glands 34a, 34b is installed on clip 40 to form the arrangement shown in FIG. 2C. Packing stack 20 is shifted laterally into clip 40 through side opening 54. Upper arms 56a, 56b and lower arms 58a, 58b are configured to elastically expand as packing stack 20 passes onto clip 40 through side opening 54. Upper arms 56a, 56b and lower arms 58a, 58b are further configured to elastically contract to retain packing stack 20 on clip 40 once inserted. Upper arms 56a, 56b and lower arms 58a, 58b thereby retain packing stack 20 on clip 40 in the desired contacting and coaxial arrangement. Spine 52 can also flex in response to packing stack 20 passing through side opening 54 and into clip 40.

Upper arms 56a, 56b engage first stack end 42 to prevent packing stack 20 from shifting laterally. As discussed in more detail below, upper arms 56a, 56b can further prevent axial movement of packing stack 20 relative to clip 40. Lower arms 58a, 58b engage second stack end 44 to prevent packing stack 20 from shifting laterally. As discussed in more detail below, lower arms 58a, 58b can further prevent axial movement of packing stack 20 relative to clip 40. Clip 40 prevents packings 36a, 36b and glands 34a, 34b from separating prior to and during installation, thereby maintaining packings 36a, 36b and glands 34a, 34b in the desired co-axial stack for proper alignment during placement on piston 12. Central bore 46 is exposed on both the top and bottom sides of clip 40 to allow for insertion of piston 12 into packing stack 20 through central bore 46 of packing stack 20. As such, a first end opening extends axially through top portion 48 such that central bore 46 is exposed through the first end opening, and a second end opening extends axially through bottom portion 50 such that central bore 46 is exposed through the second end opening.

Figure 3A:
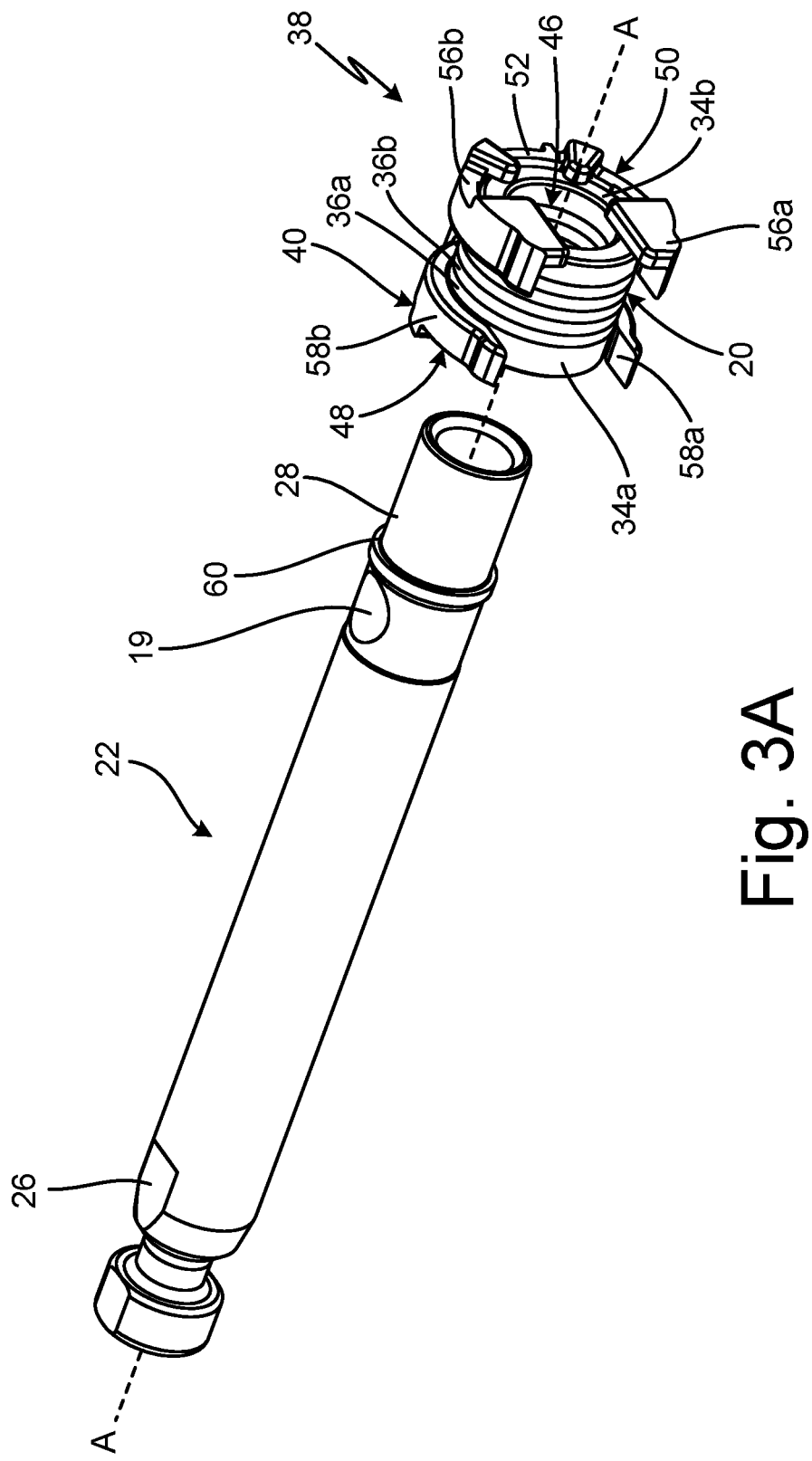
FIG. 3A is a first isometric view of a piston rod and clip and packings assembly.
Figure 3B:
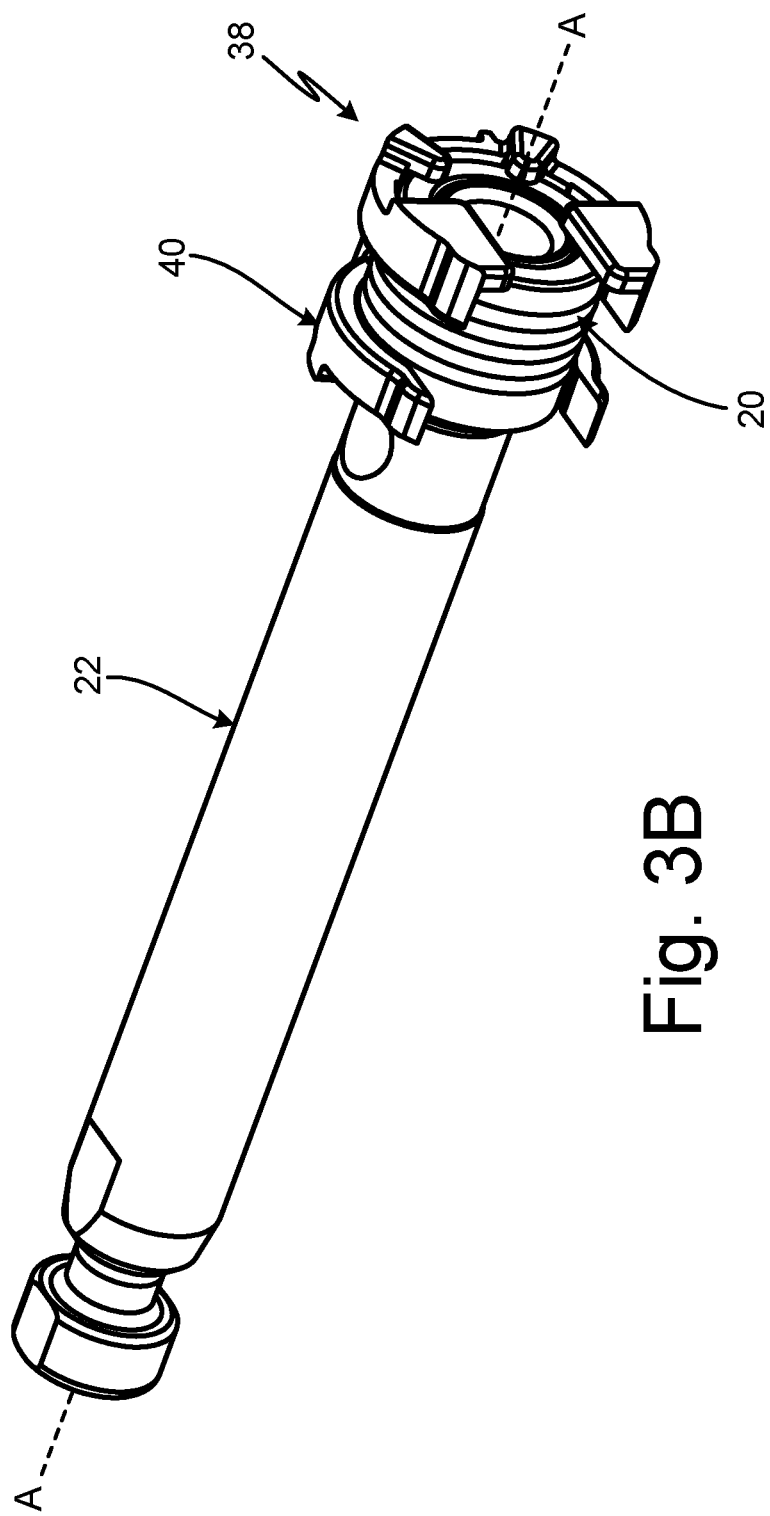
FIG. 3B is a second isometric view of a piston rod and clip and packings assembly.
Figure 3C:
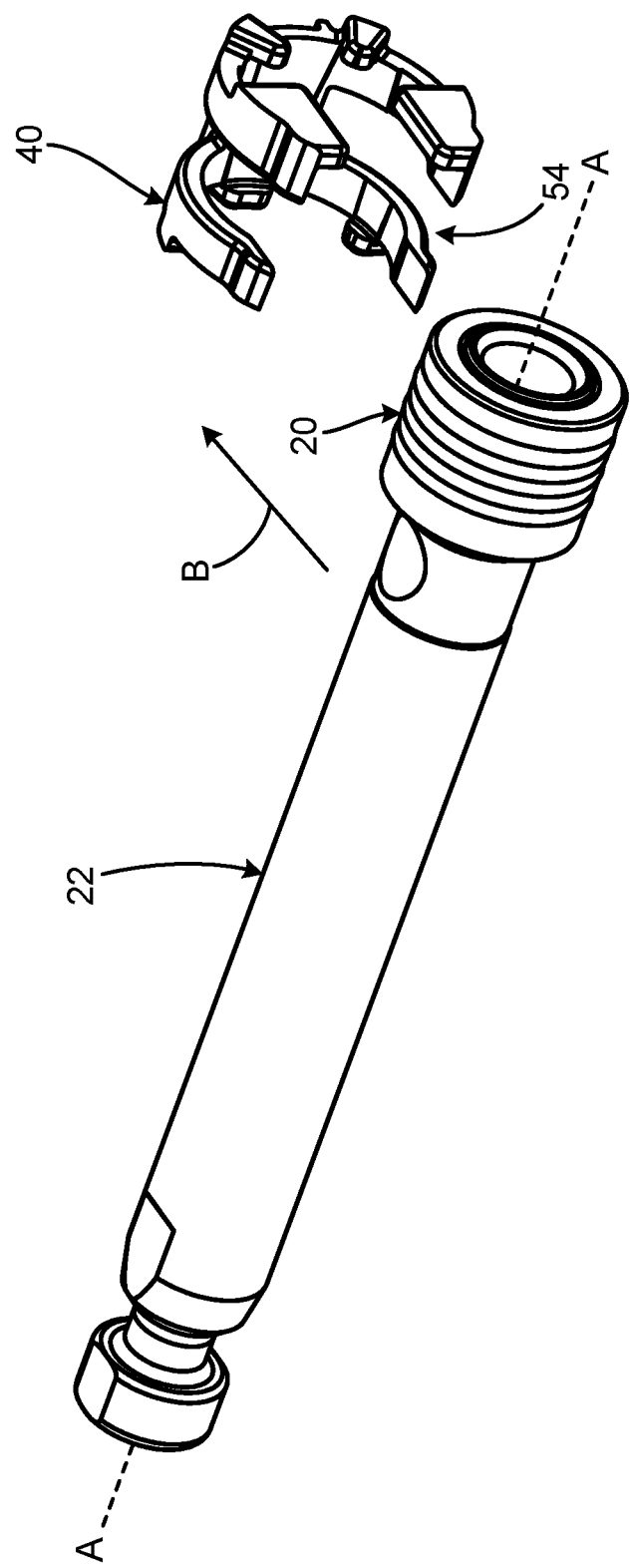
FIG. 3C is a third isometric view of a piston rod and clip and packings assembly.

FIG. 3A is a first isometric view of piston 12 and assembly 38. FIG. 3B is a second isometric view of piston rod 22 and assembly 38. FIG. 3C is a third isometric view of piston 12 and assembly 38. Piston rod 22 of piston 12 is shown. Piston rod 22 includes first end 26 and second end 28. Second end 28 includes shoulder 60. Assembly 38 includes packing stack 20 and clip 40.

FIGS. 3A-3C illustrate the installation of packing stack 20 on piston 12 Assembly 38 is aligned with piston rod 22 such that second end 28 of piston rod 22 is coaxially aligned with central bore 46 through packing stack 20. With piston rod 22 and central bore 46 coaxially aligned, assembly 38 is moved in direction A (e.g., axially) from the position shown in FIG. 3A to the position shown in FIG. 3B such that second end 28 is received within central bore 46. Gland 34a can contact shoulder 60 with packing stack 20 fully inserted onto piston rod 22. Shoulder 60 can thereby provide a visual indication to the user that packing stack 20 is properly positioned, and can provide a physical stop ensuring that packing stack 20 is properly positioned.

With assembly 38 disposed on piston rod 22, piston head 24 (FIG. 1) can then be attached (e.g., by threading) to piston rod 22 to capture packing stack 20 on piston rod 22. In some examples, clip 40 is configured such that a piston head 24 can be inserted between upper arms 56a, 56b and into central bore 46 and then into the bore in second end 28 of piston rod 22 with clip 40 still disposed on packing stack 20. As such, piston head 24 can connect to piston rod 22 with assembly 38 mounted on piston rod 22, such that piston head 24 retains packing stack 20 on piston rod 22 during removal of clip 40.

With packing stack 20 positioned on piston rod 22, clip 40 can be pulled laterally relative to piston rod 22 to remove clip 40 from packing stack 20, while leaving packing stack 20 on piston rod 22. Clip 40 can be pulled off of packing stack 20 in direction B (e.g., sideways) such that packing stack 20 is pulled through side opening 54. In some examples, direction B is orthogonal to lateral axis A-A. In this way, clip 40 is not slid off of packing stack 20 in an axial direction along lateral axis A-A (i.e. parallel with lateral axis A-A). Rather, removal of clip 40 from packing stack 20 causes top portion 48 and bottom portion 50, and specifically upper arms 56a, 56b and lower arms 58a, 58b, to elastically flex as upper arms 56a, 56b and lower arms 58a, 58b first slide around and off of packing stack 20 and then completely disengage from packing stack 20. Clip 40 thereby leaves packings 36a, 36b and glands 34a, 34b coaxially aligned and mounted on piston rod 22 (with or without piston head 24 attached to piston rod 22). As such, clip 40 can be moved axially (e.g., up and down parallel with axis A-A of piston 12) to place packing stack 20 on piston 12, and then moved sideways (e.g., laterally, orthogonal to the axial direction) to remove clip 40 from over packing stack 20 while leaving packing stack 20 mounted on piston 12.

Clip 40 can be formed from plastic (e.g., UHMWPE, polyethylene) or metal (e.g., aluminum). Packing stack 20 can be snapped into place in clip 40 and can be unsnapped upon removal of clip 40 from packing stack 20. Elastic strain within the body of clip 40, such as between upper arms 56a, 56b and lower arms 58a, 58b, can pinch and hold the elements of packing stack 20 in place and in coaxial alignment within clip 40.

Assembly 38 provides significant advantages. One benefit of clip 40 is that packings 36a, 36b and glands 34a, 34b can be placed and held in packing stack 20 in a proper order prior to installation. For example, packing stack 20 can be packaged in clip 40 (e.g., in a box, sack, blister pack, clamshell, or other package) with packings 36a, 36b and glands 34a, 34b in the correct order at the factory. In some examples, packing stack 20 can be pre-oiled prior to assembly on clip 40 and packaging for shipment. The user, upon opening the package, does not need to order and assemble packings 36a, 36b and glands 34a, 34b. Also, the user does not need to individually place the elements of packing stack 20 on the piston 12. Instead, clip 40 facilitates installation by allowing the user to slide the fully assembled packing stack 20 onto piston 12 in a first direction (e.g, axially) and then remove clip 40 in a second direction (e.g., laterally) while maintaining packing stack 20 on piston 12 in the desired position and configuration.

Figure 4A:
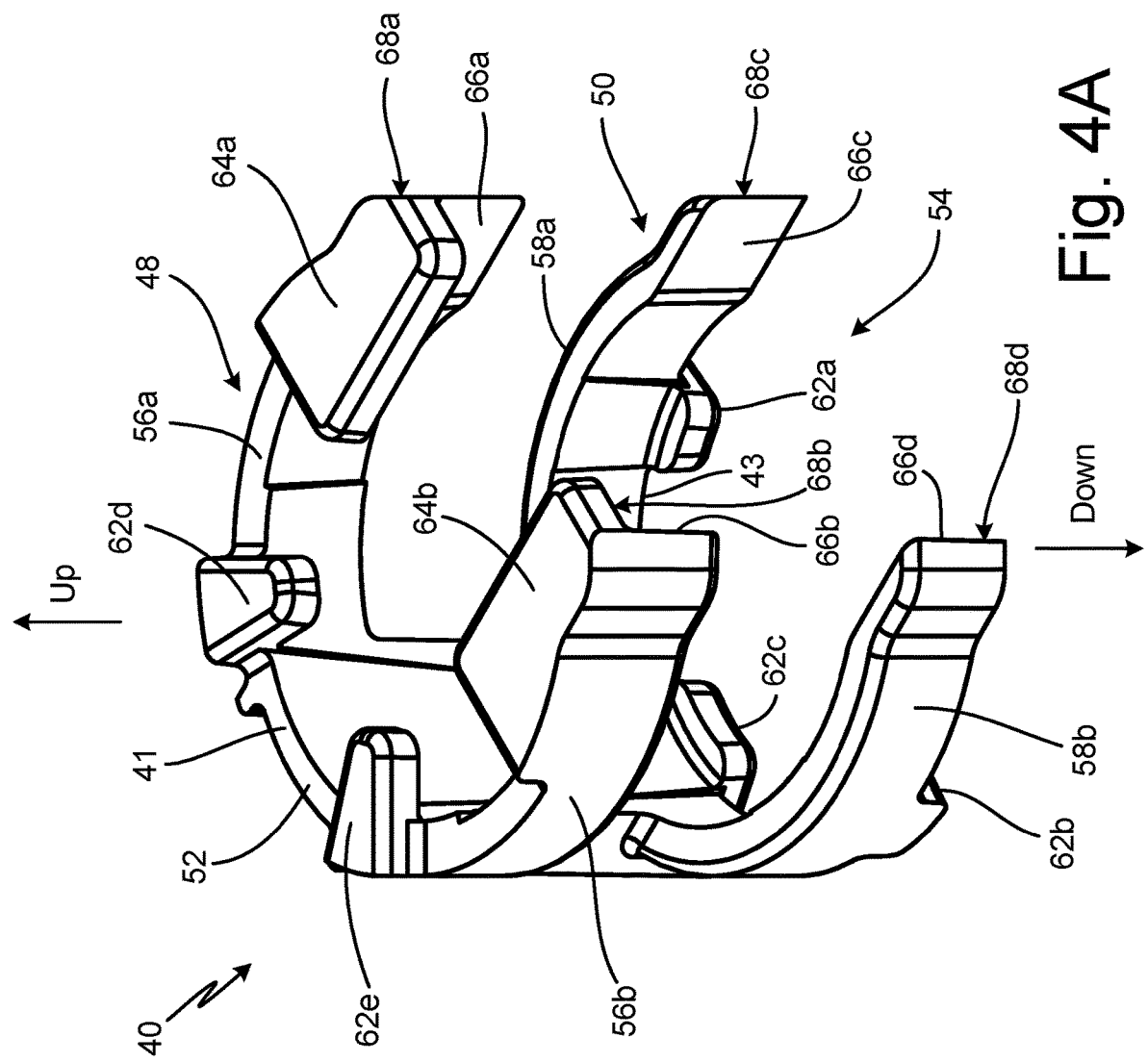
FIG. 4A is an isometric view of a clip.
Figure 4C:
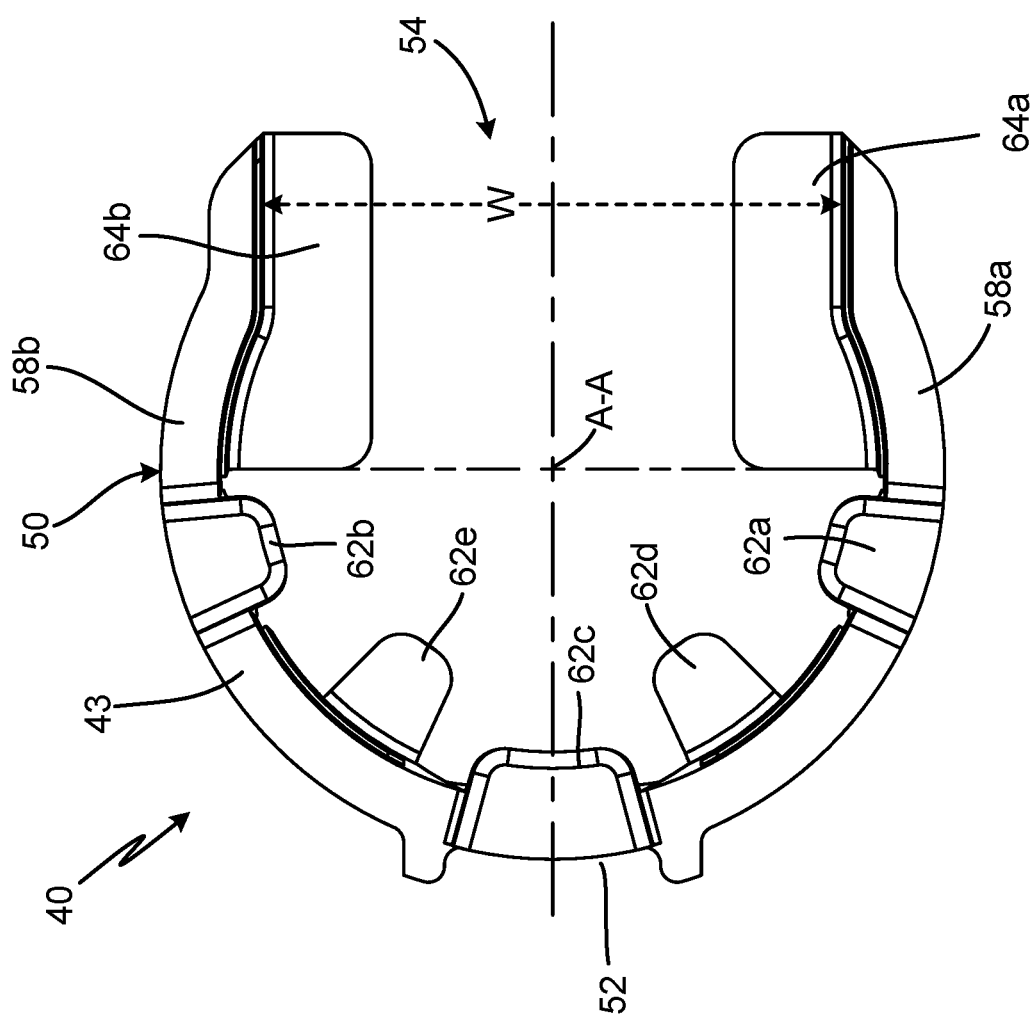
FIG. 4C is a top plan view of the clip shown in FIG. 4A.
Figure 4D:
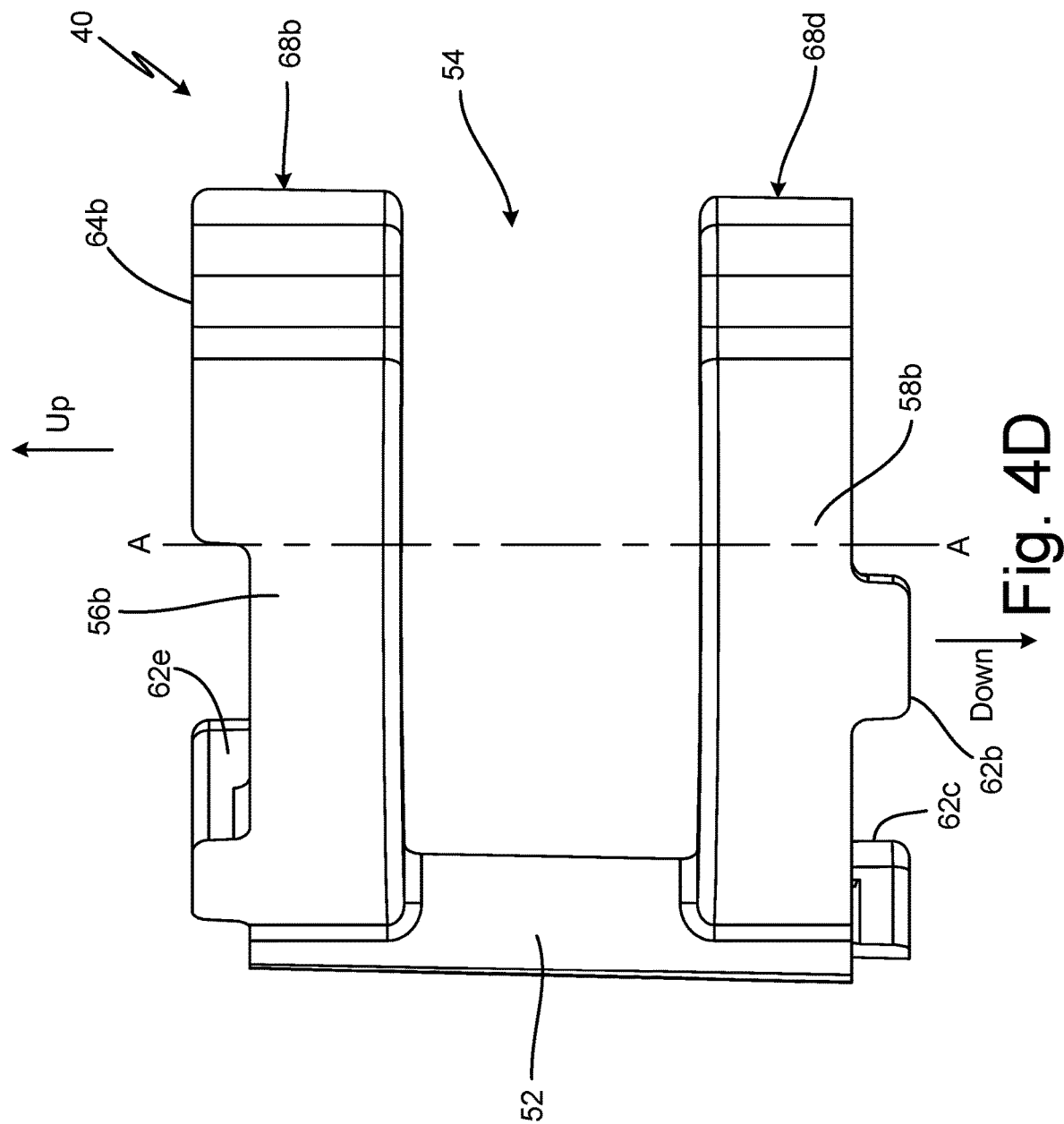
FIG. 4D is a side elevation view of the clip shown in FIG. 4A.

FIG. 4A is an isometric view of clip 40. FIG. 4B is a bottom plan view of clip 40. FIG. 4C is a top plan view of clip 40. FIG. 4D is a side elevation view of clip 40. FIG. 4E is a rear elevation view of clip 40. FIGS. 4A-4E will be discussed together. Relative up-down directions are indicated in FIG. 4A. Clip 40 includes top side 41, bottom side 43, top portion 48, bottom portion 50, spine 52, side opening 54, tabs 62a-62e, and plates 64a, 64b. Top portion 48 includes upper arms 56a, 56b. Upper arms 56a, 56b include guide surfaces 66a, 66b, respectively. Bottom portion 50 includes lower arms 58a, 58b. Lower arms 58a, 58b include guide surfaces 66c, 66d, respectively. Is it noted that clip 40 is symmetric left-to-right, so a left view indicates what would be equivalent in a right view.

Top portion 48 and bottom portion 50 are disposed at opposite axial ends of spine 52. Upper arms 56a, 56b and lower arms 58a, 58b extend from spine 23 and wrap partially, but not completely, around (e.g., circumferentially) a packing stack, such as packing stack 20 (FIGS. 1-3C). Each of top portion 48 and bottom portion 50 can be arcuate. As such, each of upper arms 56a, 56b and lower arms 58a, 58b can also be arcuate.

Each upper arm 56a, 56b extends from spine 52 such that each upper arm 56a, 56b is independent of any other arm extending from spine 52. As such, each upper arms 56a, 56b can be cantilevered from spine 52. Similarly, each lower arm 58a, 58b extends from spine 52 such that each lower arm 58a, 58b is independent of any other arm extending from spine 52. As such, each lower arms 58a, 58b can be cantilevered from spine 52. As such, each of upper arms 56a, 56b and each of lower arms 58a, 58b are free from the other arms and are not connected to the other arms, except by spine 52. Each of upper arms 56a, 56b and each of lower arms 58a, 58b independently extends from spine 52.

Guide surfaces 66a-66d are flat surfaces that guide insertion of packings 36a, 36b (FIGS. 1-3C) and/or glands 34a, 34b (FIGS. 1-3C) into clip 40. As shown, guide surfaces 66a, 66b are formed by flat surfaces disposed at the distal ends 68a, 68b of curved upper arms 56a, 56b, and guide surfaces 66c, 66d are formed by flat surfaces disposed at the distal ends 68c, 68d of curved lower arms 58a, 58b. Side opening 54 extends between and is defined between guide surface 66a and guide surface 66b and between guide surface 66c and guide surface 66d.

Tabs 62a-62e extend radially inward towards axis A-A (FIGS. 3A-3C) from top side 41 of clip 40 and bottom side 43 of clip 40. Tabs 62a-62e prevent axial or up and down movement of the elements of packing stack 20 relative to the clip 40. Tabs 62a-62c extend radially inward from the bottom side of clip 40. Tabs 62a, 62b extend from lower arms 58a, 58b, respectively. Tab 62c extends from spine 52. Tabs 62d, 62e extend from upper arms 56a, 56b, respectively. While spine 52 is shown as including tab 62c on bottom side 43, it is understood that spine 52 can include a tab 62 on top side 41 or tabs 62 on both top side 41 and bottom side 43. While lower arms 58a, 58b and upper arms 56a, 56b are each shown as including a single tab 62, it is understood that each of lower arms 58a, 58b and upper arms 56a, 56b can include more than one tab 62. In some examples, some of lower arms 58a, 58b and upper arms 56a, 56b include no tabs 62 while others include one or more tabs 62. Tabs 62a-62e prevent axial movement of packing stack 20 relative to clip 40. Upper arms 56a, 56b and lower arms 58a, 58b prevent undesired sideways or lateral movement of the elements of packing stack 20 relative to clip 40.

Plates 64a, 64b are disposed at distal ends 68a, 68b of upper arms 56a, 56b, respectively. Plates 64a, 64b extend radially inward from upper arms 56a, 56b. Plates 64a, 64b can function as tabs, similar to tabs 62a-62e, preventing axial (up and down) movement of the elements of packing stack 20 relative to clip 40. Plates 64a, 64b also guide insertion of packings 36a, 36b and/or glands 34a, 34b into clip 40.

Side opening 54 provides a passageway through which the elements of packing stack 20 can be inserted into clip 40 to be securely captured within clip 40. In some examples, side opening 54 is the only opening or space through which the elements of packing stack 20 can be inserted and/or removed from clip 40. In some cases, side opening 54 is the only opening or space through which the whole assembled packing stack 20 can be inserted and/or removed from clip 40. In some cases, side opening 54 is the only opening or space through which the individual packings 36a, 36b and/or glands 34a, 34b of packing stack 20 can be inserted and/or removed from clip 40.

Side opening 54 has width W, shown in FIG. 4C, which widens and narrows on insertion and withdrawal of the elements of packing stack 20 through side opening 54. Upper arms 56a, 56b and lower arms 58a, 58b are configured to elastically flex as packing stack 20 passes into and out of clip 40. Width W of side opening 54 elastically widens during insertion of the elements of packing stack 20 into the center of clip 40. Width W of side opening 54 elastically narrows after the elements of packing stack 20 pass through side opening 54 and the elements are contained within clip 40 (e.g., coaxial with axis A-A). Such elastic narrowing due to spring force helps retain packing stack 20 within clip 40. Width W of side opening 54 elastically widens during passage of the elements of packing stack 20 through side opening 54 during removal of packing stack 20 from clip 40. Width W of side opening 54 elastically narrows after passage of the elements of packing stack 20 through side opening 54 during removal of packing stack 20 from clip 40.

Tabs 62d, 62e and plates 64a, 64b engage the first stack end 42 (FIGS. 2A-2C) and tabs 62a-62c engage second stack end 44 (FIGS. 2A-2C) of packing stack 20 to prevent the elements of packing stack 20 from disengaging from clip 40 in either the up or down axial directions. Specifically, tabs 62d, 62e and plates 64a, 64b are peripherally arrayed around a top side of clip 40 and extend radially inward toward axis AA. Tabs 62d, 62e and plates 64a, 64b engage the top peripheral surface of packing stack 20 to contain packing stack 20 within clip 40. Likewise, tabs 62a-62c are peripherally arrayed around a bottom side of clip 40 and extend radially inward toward axis AA. Tabs 62a-62c engage the bottom peripheral surface of packing stack 20 to contain packing stack within clip 40.

Tabs 62d, 62e and plates 64a, 64b on top portion 48 have a greater length than tabs 62a-62c on bottom portion 50, such that tabs 62d, 62e and plates 64a, 64b extend further toward axis A-A at the center of clip 40 than tabs 62a-62c. When packing stack 20 is contained within clip 40 and axially aligned with axis A-A, tabs 62a-62c do not overlap, cover, and/or block the bottom opening of central bore 46 (best seen in FIGS. 2B-3A) through packing stack 20. As such, central bore 46 of packing stack 20 is fully exposed through bottom portion 50 of clip 40 to allow insertion of piston rod 22 (best seen in FIGS. 3A-3C) into central bore 46 of packing stack 20 from bottom portion 50 of clip 40, thereby facilitating mounting of packing stack 20 on piston 12 (FIG. 1). With packing stack 20 mounted within clip 40 and axially aligned with axis A-A, tabs 62d, 62e and/or plates 64a, 64b partially cover and block the top opening of central bore 46 in packing stack 20. Tabs 62d, 62e and/or plates 64a, 64b partially cover and block the top opening in central bore 46 to prevent insertion of piston 12 through the top opening of central bore 46 of packing stack 20. As such, each of tabs 62d, 62e and plates 64a, 64b can also be referred to at a block that extends over and covers at least part of central bore 46. While top portion 48 includes one or more blocks, bottom portion 50 does not include a projection extending over and covering at least part of central bore 46, such that central bore 46 can be fully exposed through the opening through bottom portion 50.

Packing stack 20 can be directionally oriented, with packings 36a, 36b and/or glands 34a, 34b having up and down orientations, such that packing stack 20 does not provide the desired sealing when installed in the incorrect, upside-down orientation. Clip 40 blocking one of the top or bottom openings of central bore 46, while exposing the other of the top or bottom openings, helps prevent packing stack 20 from being mounted on piston 12 in the incorrect orientation. For example, if the user attempts to install packing stack 20 from the incorrect orientation, tabs 62d, 62e and plates 64a, 64b interfere with and prevent piston 12 from entering into central bore 46 of packing stack 20.

Clip 40 provides significant advantages. Tabs 62a-62e and plates 64a, 64b retain packing stack 20 on clip and prevent packing stack 20 from moving axially relative to clip 40. In addition, upper arms 56a, 56b and lower arms 58a, 58b extend around packing stack 20 and retain packing stack 20 on clip 40. Upper arms 56a, 56b and lower arms 58a, 58b are configured to elastically deform to allow packing stack 20 to slide in and out of side opening 54 while installing packing stack 20 in clip 40 or on piston rod 22, while otherwise retaining packing stack 20 within clip 40. As such, assembly 38 is a standalone component that coaxially aligns the elements of packing stack 20 in the desired order for installation and maintains the elements in that desired order until installation. Clip 40 holds the elements of packing stack 20 in order and alignment prior to installation. Clip 40 further facilities installation by sliding packing stack 20 onto piston 12 and pulling away from packing stack 20 while maintaining packing stack 20 on piston 12. No additional tools besides assembly 38 are required to install packing stack 20 on piston 12.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A clip for holding a stack of packing rings having a first stack end, a second stack end, and a central bore through both the first stack end and the second stack end, on a longitudinal axis, the clip comprising:
   a spine having a first end and a second end;
   a first bracket extending from the first end of the spine partially around the axis, the first bracket configured to hold the first stack end; and
   a second bracket extending from the second end of the spine partially around the axis, the second bracket configured to hold the second stack end;
   wherein the first bracket and the second bracket define a side opening oriented to allow the packing stack to slide laterally relative to the axis and out from between the first bracket and the second bracket.

2. The clip of claim 1, wherein the first bracket comprises a plurality of upper arms extending from opposite lateral sides of the spine, such that the plurality of upper arms at least partially define the side opening.

3. The clip of claim 2, wherein the plurality of upper arms include a first upper arm extending from a first lateral side of the spine and a second upper arm extending from a second lateral side of the spine, wherein the first upper arm and the second upper arm are configured to elastically deform to increase and decrease a width of the side opening, to thereby permit the stack of packing rings to slide laterally through the side opening.

4. The clip of claim 2, wherein the second bracket comprises a plurality of lower arms extending from opposite lateral sides of the spine, such that the plurality of lower arms at least partially define the side opening.

5. The clip of claim 4, wherein the plurality of lower arms include a first lower arm extending from a first lateral side of the spine and a second lower arm extending from a second lateral side of the spine, wherein the first lower arm and the second lower arm are configured to elastically deform to increase and decrease a width of the side opening, to thereby permit the stack of packing rings to slide laterally through the side opening.

6. The clip of claim 1, wherein the side opening is disposed opposite the spine.

7. The clip of claim 1, wherein the spine is the only portion of the clip that connects the first bracket and the second bracket.

8. The clip of claim 1, wherein the first bracket defines a first end opening extending axially through the first bracket, such that the central bore of the stack of packing rings is exposed through the first end opening.

9. The clip of claim 8, wherein the second bracket defines a second end opening extending axially through the second bracket, such that the central bore of the stack of packing rings is exposed through the second end opening.

10. The clip of claim 9, wherein:
    the first bracket further comprises at least one block projecting radially inward from the first bracket and into the first end opening, the at least one block configured to extend over and cover at least part of the central bore of the stack of packing rings; and
    the second bracket does not include a projection extending over and covering at least part of the central bore, such that the central bore is fully exposed through the second end opening.

11. The clip of claim 10, wherein:
    the first bracket comprises:
       a plurality of arcuate upper arms extending from opposite lateral sides of the spine, such that distal ends of the plurality of arcuate upper arms at least partially define the side opening;
    the second bracket comprises:
       a plurality of arcuate lower arms extending from opposite lateral sides of the spine, such that distal ends of the plurality of arcuate lower arms at least partially define the side opening; and
       a first lower tab projecting radially from a first one of the plurality of arcuate lower arms, the first lower tab configured to engage the second stack end of the stack of packing rings to axially retain the stack of packing rings within the clip;
    the block extends from a first one of the plurality of arcuate upper arms.

12. The clip of claim 11, further comprising:
    a first guide plate disposed at a distal end of the first one of the plurality of arcuate upper arms, the first guide plate extending over the side opening;
    a first flat disposed below the first guide plate at the distal end of the first one of the plurality of arcuate upper arms;
    a second guide plate disposed at a distal end of a second one of the plurality of arcuate upper arms, the second guide plate extending over the side opening; and
    a second flat disposed below the second guide plate at the distal end of the second one of the plurality of arcuate upper arms;
    wherein the first flat is disposed across from and oriented towards the second flat such that the side opening is at least partially defined between the first flat and the second flat.

13. An assembly comprising:
the clip of claim 1; and
the packing stack mounted within the clip and retained within the clip by the first bracket and the second bracket.

14. A method of loading a piston with the assembly of claim 13, the method comprising:
axially aligning the stack of packing rings with an end of the piston;
shifting the clip axially over the end of the piston such that the piston extends into the central bore of the stack of packing rings; and
pulling the clip laterally relative to the piston and the stack of packing rings such that the stack of packing rings are released from the clip through the side opening of the clip while the stack of packing rings remain on the end of the piston.

15. The method of claim 14, wherein pulling the clip laterally relative to the piston comprises pulling the clip in a direction orthogonal to the axis.

16. The method of claim 14, wherein:
the first bracket comprises a plurality of upper arms extending from opposite lateral sides of the spine, such that the plurality of upper arms at least partially define the side opening;
the second bracket comprises a plurality of lower arms extending from opposite lateral sides of the spine, such that the plurality of lower arms at least partially define the side opening; and
the plurality of upper arms and the plurality of lower arms flex to widen the side opening as the clip is pulled laterally relative to the piston.

17. The method of claim 16, further comprising:
forming the stack of packing rings by:
arranging a plurality of packings in a desired configuration;
placing a first gland at a first end of the packings; and
placing a second gland at a second end of the packings;
aligning the stack of packing rings with the side opening; and
shifting the stack of packing rings laterally through the side opening and into the clip.

18. The method of claim 14, further comprising:
blocking a first end opening defined through the first bracket with at least one tab extending laterally towards the axis from the first bracket to prevent an object having a diameter approximately equal to a diameter of the first end opening from passing through the first end opening.

19. A method comprising:
sliding a packing assembly in a first axial direction and onto an end of a piston for a reciprocating fluid pump, wherein the packing assembly comprises:
a clip having at least one bracket defining a side opening; and
a packing stack retained on the clip and held in axial alignment on a longitudinal axis by the at least one bracket of the clip; and
shifting the clip laterally relative to the piston to disengage the packing stack from the clip through the side opening leaving the packing stack disposed on the piston.

20. An assembly comprising:
a packing stack formed from a plurality of packing rings disposed on a stack axis, the packing stack comprising:
a first stack end;
a second stack end disposed opposite the first stack end; and
a central bore extending through the plurality of packing rings between the first stack end and the second stack end; and
a clip configured to hold the packing stack, the clip comprising:
a spine having a first end and a second end;
a top portion extending partially around the axis from the first end of the spine; and
a bottom portion extending partially around the axis from the second end of the spine;
wherein the top portion and the bottom portion define an axially extending side opening oriented to allow the packing stack to slide laterally relative to the axis into and out of an area defined between the top portion, the bottom portion, and the spine.

* * * * *